(12) United States Patent
Yoshida et al.

(10) Patent No.: US 6,404,886 B1
(45) Date of Patent: Jun. 11, 2002

(54) METHOD AND APPARATUS FOR ECHO CANCELLING WITH MULTIPLE MICROPHONES

(75) Inventors: Tatsumasa Yoshida; Masashi Takada, both of Tokyo (JP)

(73) Assignee: Oki Electric Industry Co., Ltd., Toyko (JP)

( * ) Notice: Subject to any disclaimer, the term of this patent is extended or adjusted under 35 U.S.C. 154(b) by 0 days.

(21) Appl. No.: 09/556,973

(22) Filed: Apr. 24, 2000

(30) Foreign Application Priority Data

Nov. 15, 1999 (JP) .......................................... 11-323798

(51) Int. Cl.[7] ................................................ H04M 9/08
(52) U.S. Cl. ............................ 379/406.01; 379/406.05; 379/406.08
(58) Field of Search ................................ 379/391, 388, 379/389, 390, 406–410

(56) References Cited

U.S. PATENT DOCUMENTS

| | | | |
|---|---|---|---|
| 5,323,458 A | * 6/1994 | Park et al. | ................. 379/406 |
| 5,323,459 A | * 6/1994 | Hirano | ....................... 379/406 |
| 5,631,900 A | * 5/1997 | McCaslin et al. | ........... 379/406 |
| 5,920,548 A | * 7/1999 | El Malki | .................... 379/410 |

* cited by examiner

*Primary Examiner*—Vivian Chin
*Assistant Examiner*—Ramnandan Singh
(74) *Attorney, Agent, or Firm*—Venable; Michael A. Sartori

(57) ABSTRACT

An echo canceling apparatus has two microphones, both receiving an acoustic signal including a near-end speech component and an echo component. A first adaptive filter cancels the echo component in the output of the first microphone, obtaining a first residual signal. A second adaptive filter cancels the echo component in the output of the second microphone, obtaining a second residual signal. The two residual signals are added together with a timing delay compensating for the delay between their near-end speech components. In the resulting sum signal, the near-end speech component is enhanced, while the echo component, and a near-end background noise component, are relatively weakened.

18 Claims, 18 Drawing Sheets

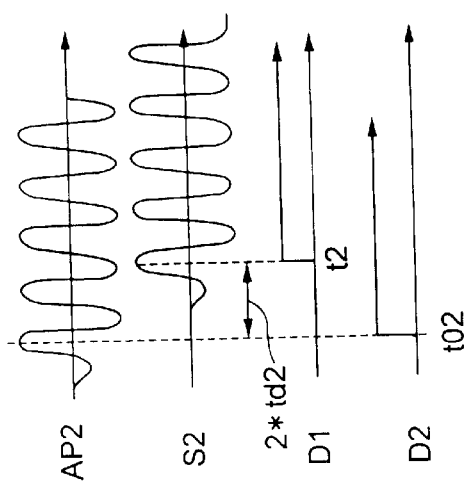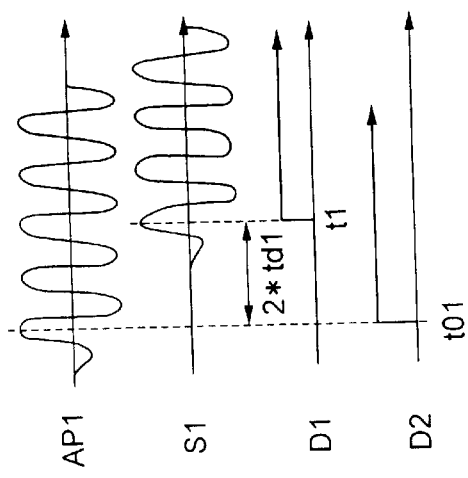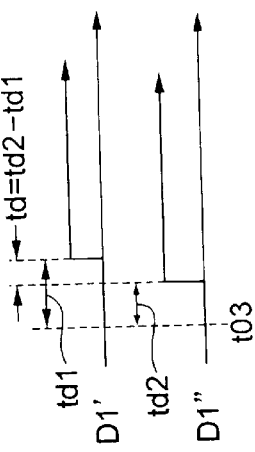

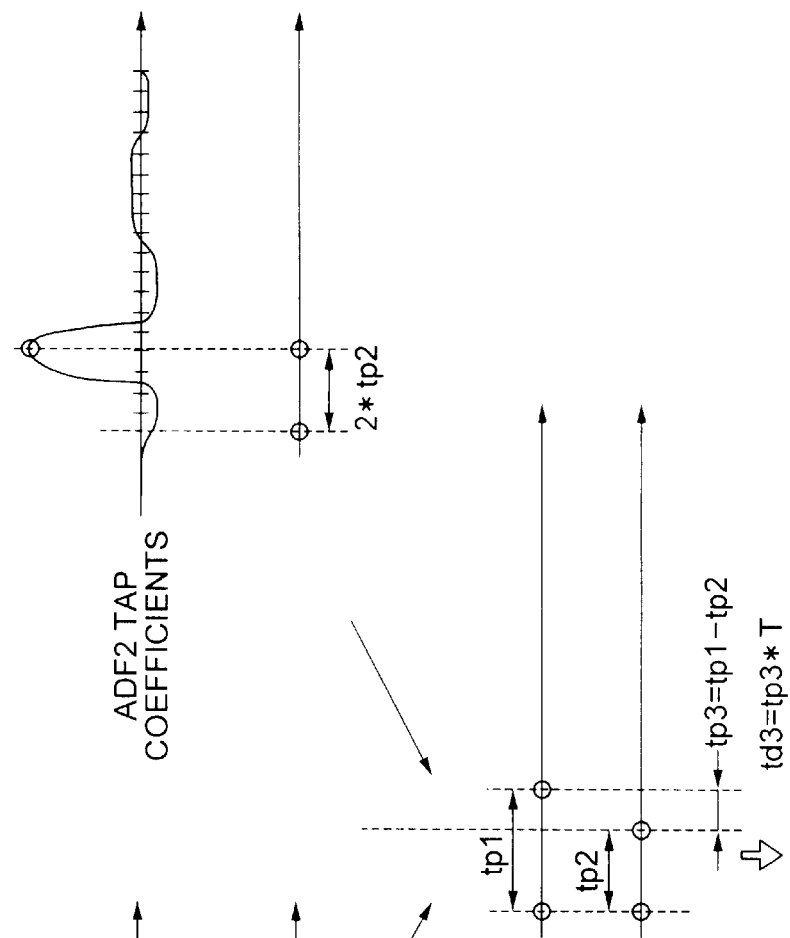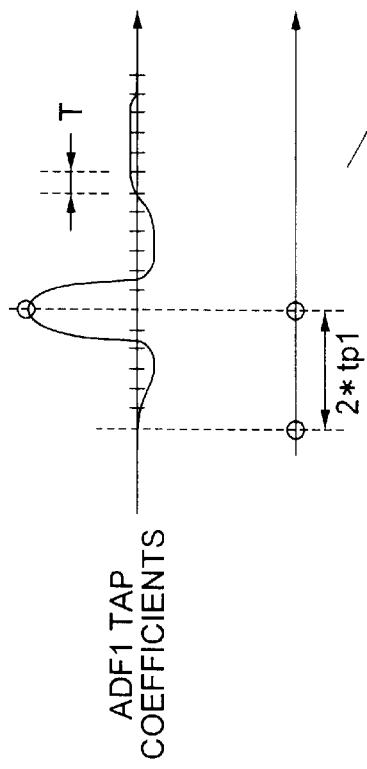

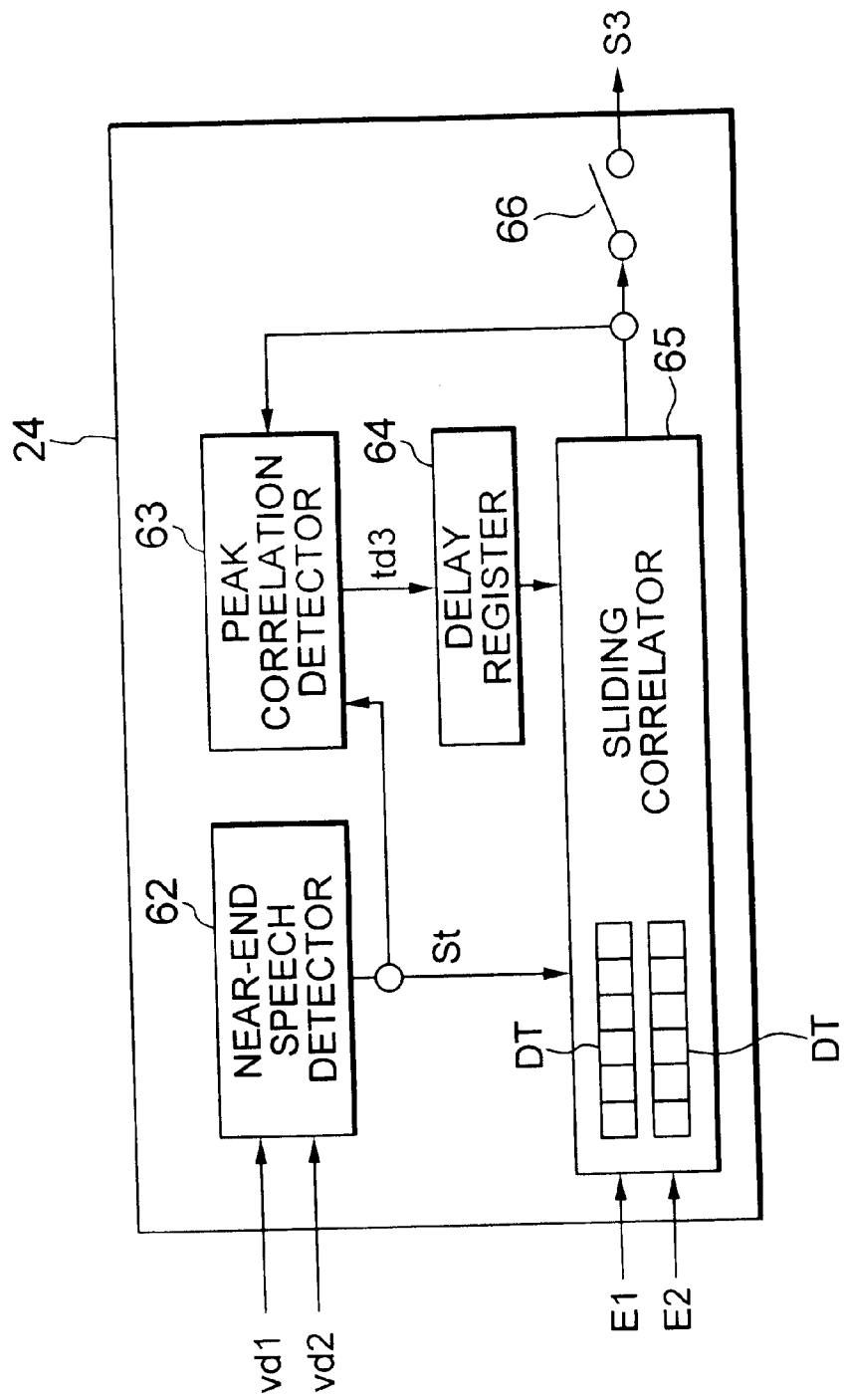

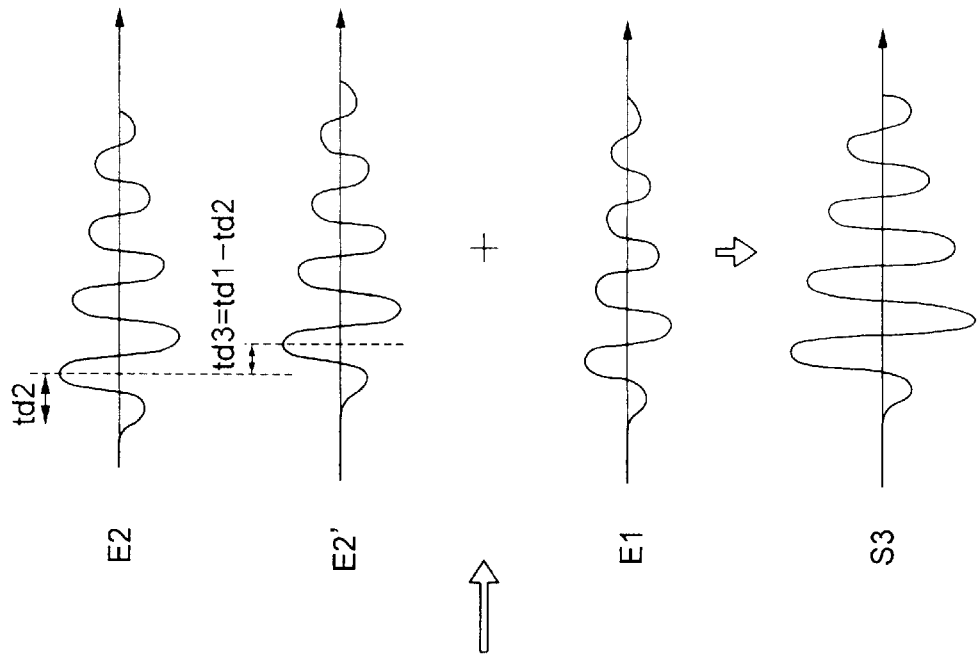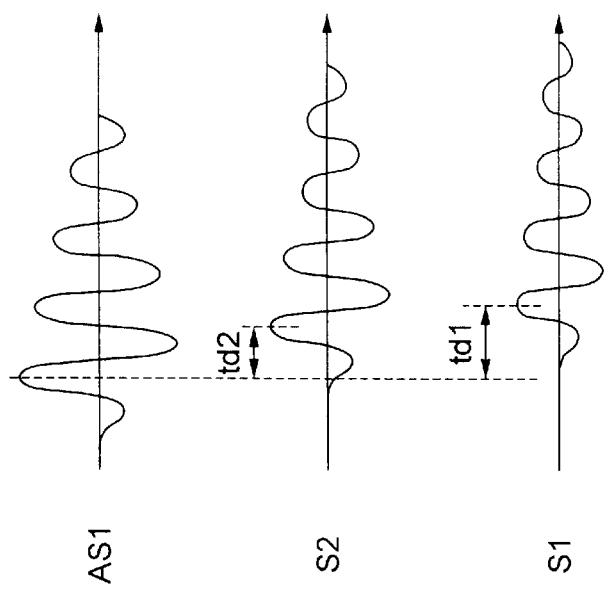

METHOD AND APPARATUS FOR ECHO CANCELLING WITH MULTIPLE MICROPHONES

BACKGROUND OF THE INVENTION

The present invention relates to an echo canceling apparatus useful in a hands-free communication device such as a teleconferencing terminal or a mobile telephone set mounted in an automobile.

Referring to FIG. 1, in a conventional echo canceling apparatus of the type used in a hands-free telephone set, an incoming far-end speech signal Rin, received as an electrical signal at an input terminal 11, is reproduced through a loudspeaker SP as a far-end acoustic signal AS2. A near-end acoustic signal AS1, carrying the voice of a near-end party or user U, is picked up by a microphone M and converted to an electrical speech signal S. The microphone M also picks up an echo of the far-end acoustic signal AS2, which is reflected by the near-end party U and other objects in the ambient environment. The microphone output signal S thus includes an undesired far-end echo component as well as the desired near-end voice component.

The microphone output signal S is supplied to an echo canceler EC having an adaptive filter ADF that generates an echo replica Res from the received far-end signal Rin. A subtractor 13 (shown as an adder with a minus sign beside the subtrahend input) subtracts the echo replica Res from the microphone output signal S to obtain a residual signal E. Ideally, the echo replica Res exactly matches the echo of the far-end signal, so that the echo is completely removed from the residual signal E. The residual signal E is supplied to an output terminal 12, to be transmitted to the far-end party as an outgoing speech signal Sout.

The adaptive filter ADF has tap coefficients that are updated with reference to the residual signal E, to adapt to changes in propagation characteristics of the echo path. The updating takes place under the control of a talk state detector or double-talk detector DTD, which determines the current near-end and far-end talking states by comparing signals Rin and E, or Rin, E, and S. Updating of the tap coefficients is generally limited to the receive single-talk state, in which only the far-end party is talking. The updating algorithm attempts to minimize the power of the residual signal E in this state. During the double-talk state, in which both parties speak at once, the tap coefficients are held unchanged, but the adaptive filter continues to generate an echo replica Res, which is subtracted from the outgoing speech signal, so that the far-end party does not hear an echo of his or her own voice.

A problem is that the near-end acoustic environment may include a noise source NS, which generates a background acoustic noise signal AS3. The noise signal AS3, which is also picked up by the microphone M, cannot be replicated by the adaptive filter ADF, because it is unrelated to the far-end signal Rin. Accordingly, the echo canceler EC does not remove near-end background noise from the outgoing speech signal Sout. The background noise also interferes with the tap-coefficient updating algorithm, so that the echo replica Res does not match the actual far-end echo component, and some residual echo remains in the outgoing speech signal Sout. In general, the echo canceler EC cannot reduce the residual echo level below the background noise level.

Thus despite echo cancellation, the outgoing speech signal is contaminated by background noise and uncanceled echo, and does not have as high a signal-to-noise ratio as might be desired.

SUMMARY OF THE INVENTION

An object of the present invention is to improve the output signal-to-noise ratio of an echo canceling apparatus.

The invented method of canceling echo includes the steps of:

receiving an acoustic signal, including a near-end component and an echo component, at a first microphone and a second microphone, obtaining a first output signal from the first microphone and a second output signal from the second microphone;

using a first adaptive filter to cancel the echo component in the first microphone output signal, obtaining a first residual signal;

using a second adaptive filter to cancel the echo component in the second microphone output signal, obtaining a second residual signal;

determining a timing delay between the near-end components in the first and second residual signals; and additively combining the first and second residual signals according to the timing delay to obtain an outgoing signal.

The timing delay is determined from, for example, a timing difference between detection of the near-end components in the first and second microphone output signals, a timing difference between echo delay times of artificially generated acoustic reference signals, a difference between the positions of peak tap coefficients in the first and second adaptive filters, or a sliding correlation of the first and second residual signals.

The invention also provides an echo canceling apparatus having a pair of microphones, a corresponding pair of echo cancelers with respective adaptive filters, and a combining unit combining the residual signals from the two echo cancelers according to a timing delay as described above.

The signal-to-noise ratio of the outgoing signal is improved because when the two residual signals are combined, the two near-end components reinforce each other, while other components become relatively weakened.

BRIEF DESCRIPTION OF THE DRAWINGS

In the attached drawings:

FIGS. 10A, 10B, and 10C are waveform diagrams illustrating the operation of the second embodiment;

FIGS. 14A, 14B, and 14C are tap-coefficient diagrams illustrating the operation of the third embodiment;

FIG. 15 is a block diagram illustrating the internal structure of the delay adder in a fourth embodiment;

FIGS. 16A and 16B are waveform diagrams illustrating the operation of the fourth embodiment;

DETAILED DESCRIPTION OF THE INVENTION

Figure 1:
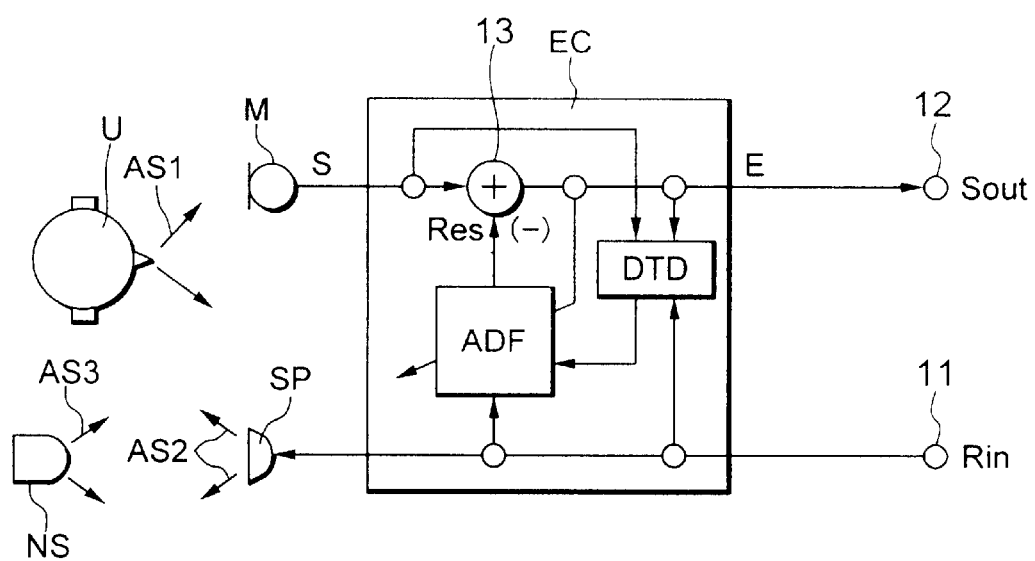
FIG. 1 is a block diagram of a conventional echo canceler.

Embodiments of the invention will be described with reference to the attached drawings, in which like parts are indicated by like reference characters. All of the embodiments are suitable for use in hands-free telephone sets.

Each embodiment has a loudspeaker that reproduces a far-end signal, and a plurality of microphones with respective echo cancelers. Each echo canceler removes an echo of the far-end signal from the signal picked up by its own microphone, without canceling the near-end component of the microphone output signal. When the near-end party is speaking, the near-end component includes a voice signal. A combining unit aligns the residual signals obtained from the echo cancelers so that the near-end party's voice has the same phase in all of the residual signals. The aligned signals are then added together to obtain an outgoing signal in which the near-end party's voice is emphasized, and other components, such as residual echo and background noise, are relatively weakened.

The echo cancelers and combining units used in the embodiments are digital circuits, while the microphones and loudspeakers are analog devices. The apparatus accordingly includes analog-to-digital and digital-to-analog converters, but these have been omitted to simplify the drawings.

Figure 2:
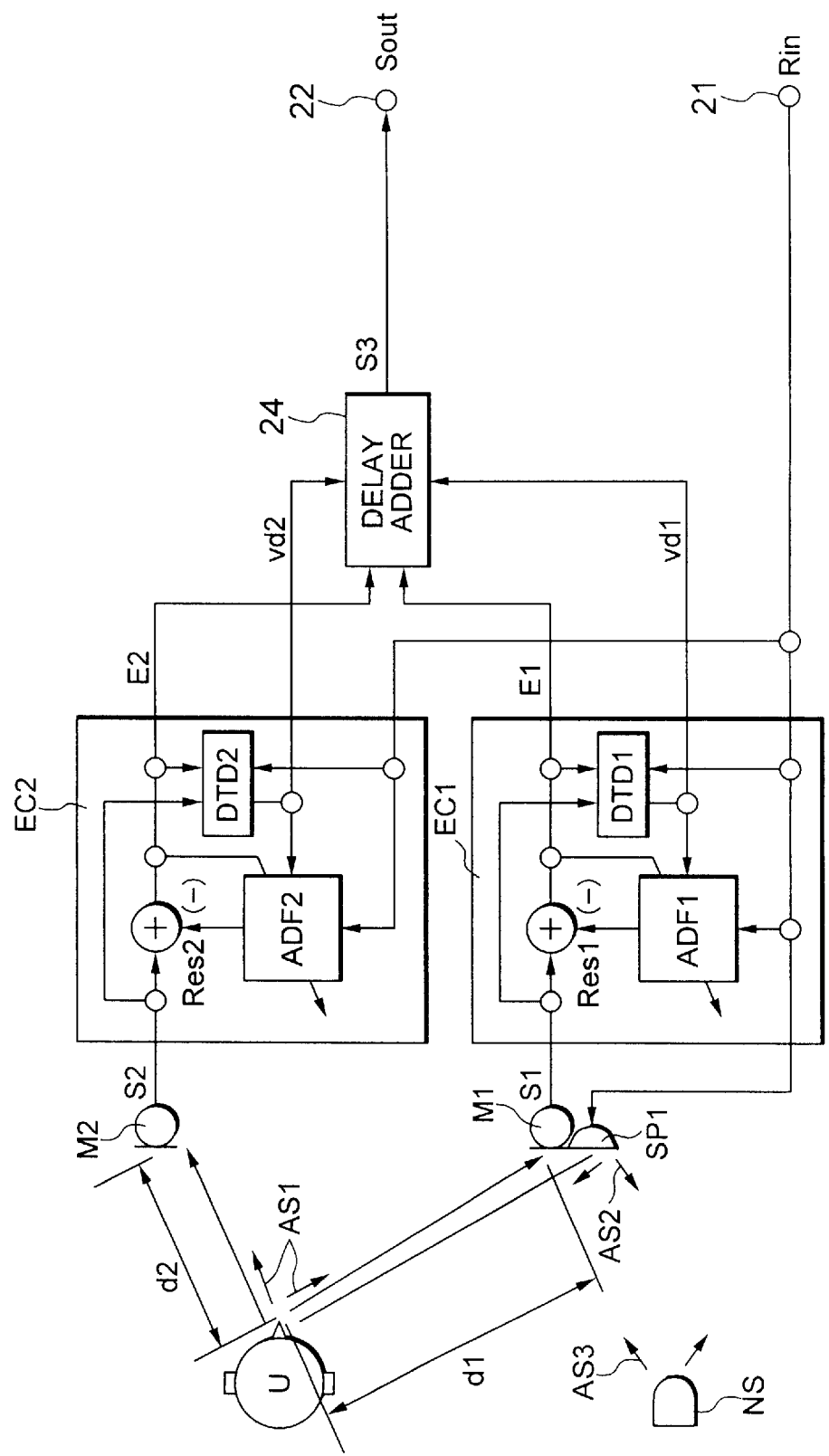
FIG. 2 is a block diagram of an echo canceling apparatus illustrating a first embodiment of the present invention.

Referring to FIG. 2, the first embodiment is an echo canceling apparatus comprising a loudspeaker SP1, a pair of microphones M1, M2, corresponding echo cancelers EC1, EC2, an incoming speech signal input terminal 21, an outgoing speech signal output terminal 22, and a delay adder 24. Microphone M1 generates a first electrical output signal S1. Microphone M2 generates a second electrical output signal S2. Microphone M2 is situated in a position spatially removed from microphone M1.

The loudspeaker SP1 is shown situated adjacent microphone M1, but this is not a requirement. The loudspeaker SP1 may be situated adjacent microphone M2, for example, or in any other convenient position.

Each of the two echo cancelers EC1, EC2 has the same configuration and the same functions as the conventional echo canceler EC shown in FIG. 1. Echo canceler EC1 includes a first adaptive filter ADF1 and a first talk state detector DTD1. Echo canceler EC2 includes a second adaptive filter ADF2 and a second talk state detector DTD2. Both echo cancelers EC1, EC2 receive the far-end signal Rin. In addition, echo canceler EC1 receives the first microphone output signal S1 and generates a first residual signal E1, while echo canceler EC2 receives the second microphone output signal S2 and generates a second residual signal E2.

The internal components of the adaptive filters and talk state detectors are well known, and have been omitted to simplify the drawings.

The first adaptive filter ADF1 generates a first echo replica signal Res1 from the received far-end signal Rin, using tap coefficients that are adaptively updated according to the first residual signal E1. The first residual signal E1 is obtained by subtraction of the first echo replica signal Res1 from the first microphone output signal S1. The adaptive filter ADF1 has registers for storing a certain number of tap coefficients and an equal number of samples of the microphone output signal S1, one or more multipliers for multiplying the sample values by the corresponding tap coefficients, an accumulator for adding up the resulting products, and an updating unit that updates the tap coefficients according to, for example, the normalized least mean squares algorithm. This well-known algorithm forces the tap coefficients to converge toward the impulse response of the echo path from loudspeaker SP1 to microphone M1.

The first talk state detector DTD1 receives the first microphone output signal S1, the first residual signal E1, and the far-end signal Rin, determines the near-end and far-end talking states, and outputs a first talk state signal vd1 indicating these states. The first talk state detector DTD1 recognizes a double-talk state, in which both the far-end signal Rin and the first residual signal E1 include valid speech components; a receive single-talk state, in which only Rin includes a valid speech component; and a transmit single-talk state in which only E1 includes a valid speech component. The talk state detector DTD1 operates by, for example, comparing the power of the received far-end signal Rin and the first residual signal E1 with respective thresholds.

The first adaptive filter ADF1 receives the first talk state signal vd1 from the first talk state detector DTD1. In the receive signal-talk state, the first adaptive filter ADF1 updates its tap coefficients, thereby adapting to changes in the propagation characteristics of the echo path. In the double-talk state and the transmit single-talk state, the first adaptive filter ADF1 does not update its tap coefficients.

The adaptive filter ADF2 and talk state detector DTD2 in the second echo canceler EC2 are identical to the adaptive filter ADF1 and talk state detector DTD1 in the first echo canceler EC1, and operate in the same way. The second residual signal E2 differs from the first residual signal E1, however, because of differences between the two microphone output signals S1, S2. The differences arise primarily from the different positional relationships among the microphones M1, M2 and the near-end party U.

Similarly, the talk state signal vd2 output from the second talk state detector DTD2 differs from the talk state signal vd1 output from the first talk state detector DTD1. In particular, transitions to the double-talk state, and transitions to the transmit single-talk state, occur at different times in the two talk state signals vd1, vd2, because of the different positional relationships among the microphones M1, M2 and the near-end party U.

Figure 3:
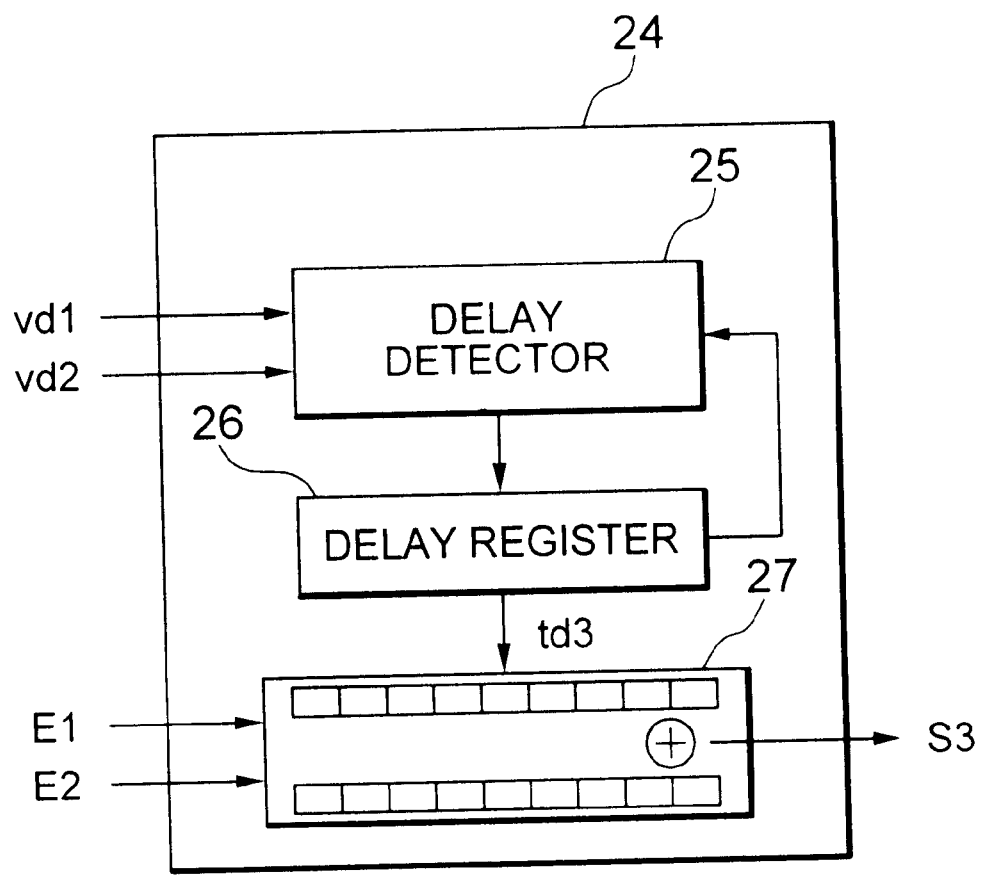
FIG. 3 is a block diagram showing the internal structure of the delay adder in FIG. 2.

The delay adder 24 functions as the combining unit in the first embodiment, receiving the two residual signals E1, E2 and the two talk state signals vd1, vd2, and generating a combined signal S3, which is supplied to the output terminal 22 as the outgoing speech signal Sout. Referring to FIG. 3, the delay adder 24 comprises a delay detector 25, a delay register 26, and a sliding adder 27.

The delay detector 25 detects the timing difference between corresponding transitions in the two talk state signals vd1, vd2. Specifically, it detects differences in the timing of transitions to the states in which near-end speech is detected. The difference is output as a timing delay td3.

The delay register 26 stores the timing delay value td3 supplied by the delay detector 25, and supplies the stored delay value to the sliding adder 27.

The sliding adder 27 adds the two residual signals E1, E2 together, allowing for the delay td3, and supplies the combined sum S3 to the output terminal 22 as the outgoing speech signal Sout. The sliding adder 27 has memory facilities such as shift registers or ring buffers for storing a certain number of samples of each of the two residual signals E1, E2, and an arithmetic facility for adding an arbitrary sample of the first residual signal E1 to an arbitrary sample of the second residual signal E2.

Next, the operation of the first embodiment will be described. It will be assumed that initially, both talk state detectors DTD1, DTD2 detect the receive single-talk state.

During this state, both adaptive filters ADF1, ADF2 adjust their tap coefficients so as to replicate the echo of the far-end acoustic signal AS2 output from the loudspeaker SP1. The updating process is affected by a background noise signal AS3 produced by a noise source NS, shown in FIG. 2. The tap coefficients therefore fail to converge exactly to the impulse responses of the echo paths from loudspeaker SP1 to the two microphones M1, M2, and the echo replica signals Res1, Res2 do not exactly match the far-end echo components in the microphone output signals S1, S2. Thus, although far-end echo is canceled to some degree in the residual signals E1, E2, it is not canceled completely.

When the near-end party U begins speaking, the speech signal AS1 is picked up by the microphones M1, M2 at different times, since microphones M1, M2 are at different distances d1, d2 from the near-end party U. The precise timing difference depends on the way in which the near-end party's voice is reflected by the ambient acoustic environment, and in theory could be calculated from acoustic principles, but for simplicity, it will be assumed below that the timing difference arises from the different distances d1, d2 indicated in FIG. 2. It will be further assumed that the near-end party U is closer to the second microphone M2 than to the first microphone M1 (d1>d2).

Figure 4:
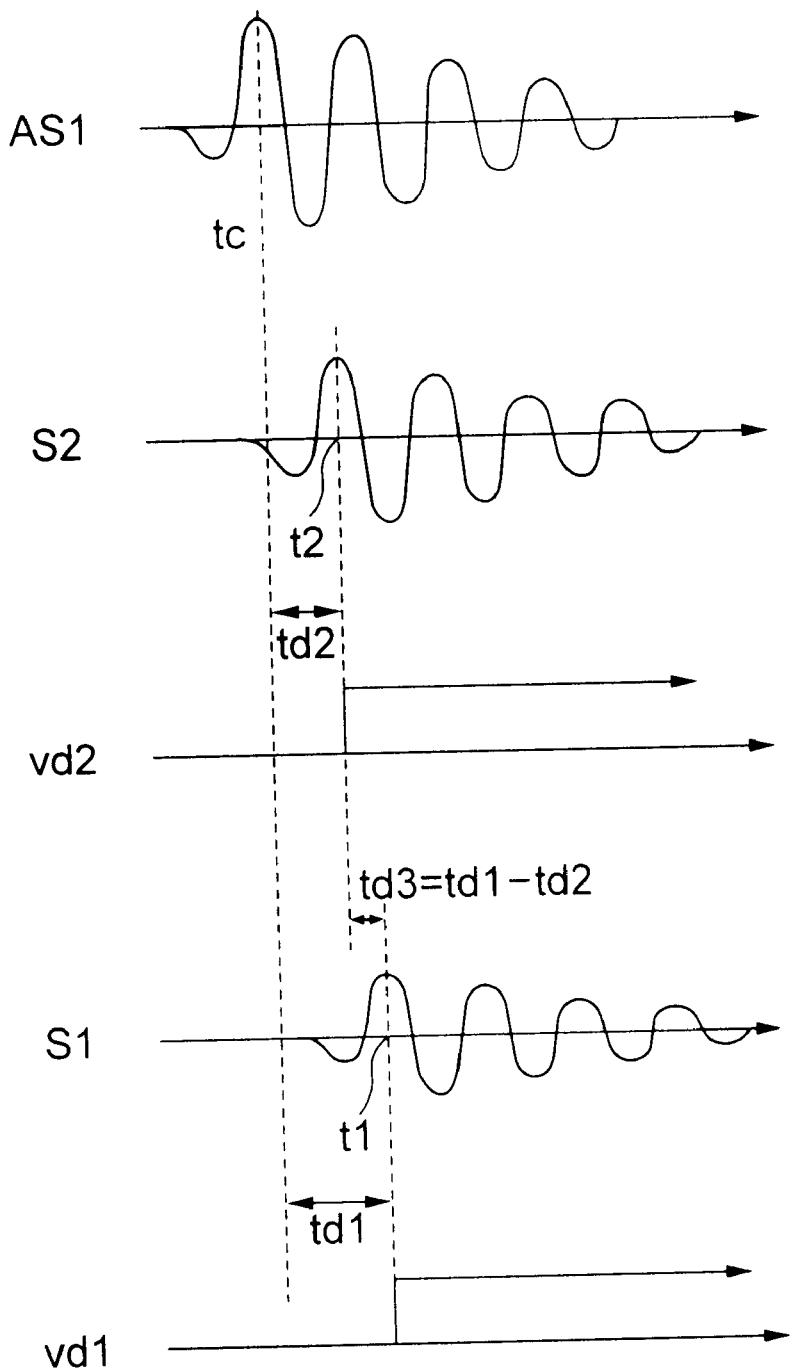
FIGS. 4 and 5 are waveform diagrams illustrating the operation of the first embodiment.

FIG. 4 shows examples of waveforms of the near-end party's speech signal AS1, the second microphone output signal S2, the second talk state signal vd2, the first microphone output signal S1, and the first talk state signal vd1. The near-end party U begins speaking at time tc. The near-end party's voice signal is detected by the second talk state detector DTD2 with a delay td2, at time t2, and by first talk state detector DTD1 with a longer delay td1, at time t1. The talk state signals vd1, vd2, which had been indicating the single-talk state, change to indicate the double-talk state at these respective times t1, t2. The two adaptive filters ADF1, ADF2 stop updating their tap coefficients at these times t1, t2.

The delay detector 25 receives the talk state signals vd1, vd2, determines the delay td3 between double-talk detection timing in the two talk state detectors DTD1, DTD2, and stores the delay value td3 in the delay register 26, from which it is supplied to the sliding adder 27. The delay detector 25 calculates the delay td3 from t1 and t2 as follows.

$$td3 = t1 - t2$$

Although the delay detector 25 cannot detect time tc or determine the delay values td1 and td2, it is clear from FIG. 4 that the delay td3 can also be expressed as follows.

$$td3 = td1 - td2$$

The delay td3 corresponds to the difference in distances d1, d2 from the near-end party U to microphones M1, M2. The delay td3 does not correspond to the difference in distances from the microphones M1, M2 to the background noise source NS. Nor does td3 correspond to the difference in the length of the two echo paths from loudspeaker SP1 to microphones M1, M2, insofar as the two echo paths include reflections from objects other than the head of the near-end party U.

Figure 5:
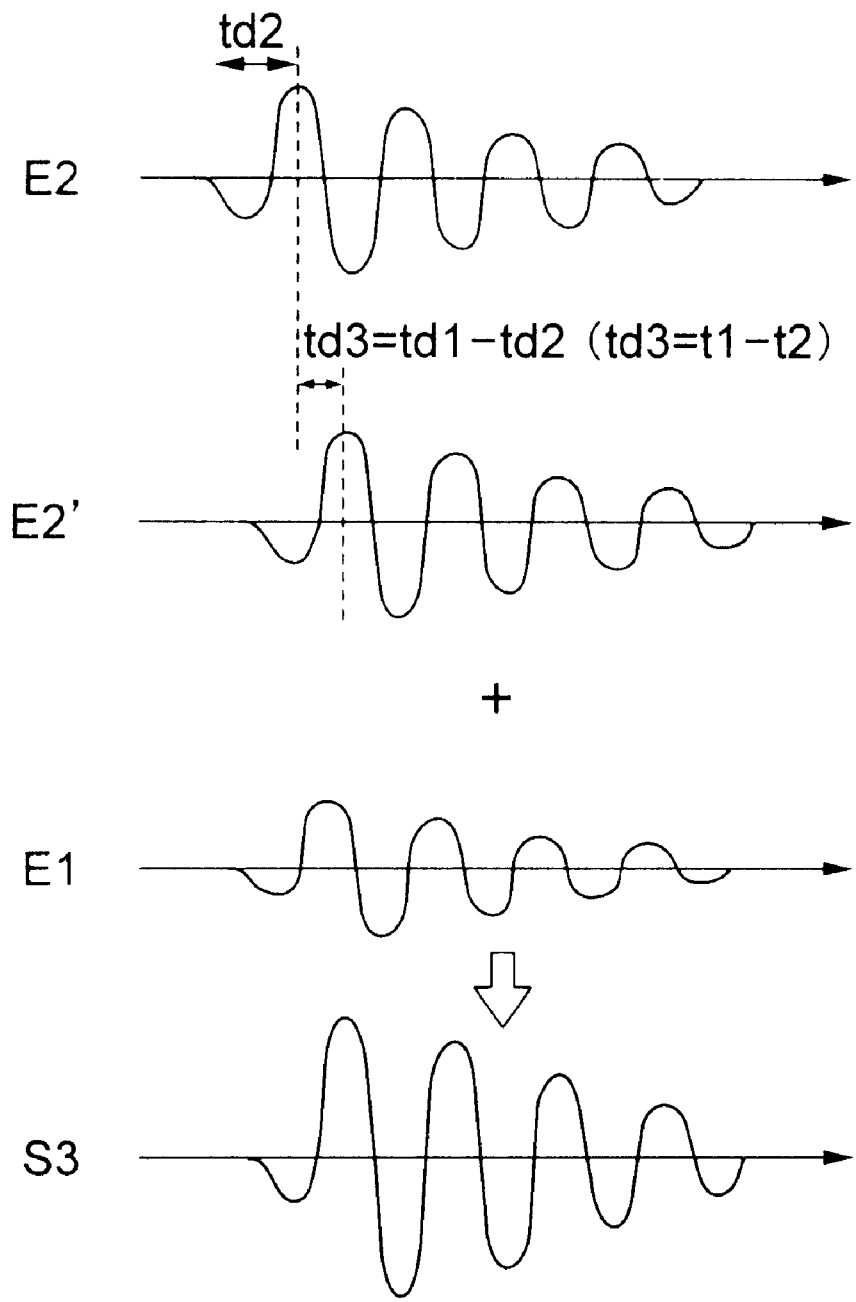

The sliding adder 27 combines pairs of sample values that are separated by a timing offset equal to the delay td3. Referring to FIG. 5, the sliding adder 27 slides or delays residual signal E2 by this amount td3 to obtain a residual signal E2' that is aligned in phase with the first residual signal E1, as far as the near-end speech component of the residual signals is concerned. The sliding adder adds corresponding values of the delayed residual signal E2' to the first residual signal E1 to obtain the output signal S3.

The added residual signals E1 and E2' include near-end speech, uncanceled far-end echo, and near-end background noise components. When added together, the near-end speech components reinforce each other, because they are aligned in phase. The background noise components do not reinforce each other in this way. The residual echo components reinforce each other to the extent that the echoes are reflected from the head of the near-end party U, but much of the echo is reflected from other objects in the acoustic environment, and is not reinforced. Echo and noise components that do not reinforce each other tend to interfere with each other when the two residual signals are added, so background noise and echo are attenuated to some extent in the output signal S3.

The background noise and echo components therefore become weakened relative to the reinforced near-end speech component, and the signal-to-noise ratio of the outgoing speech signal Sout is improved.

Figure 6A:
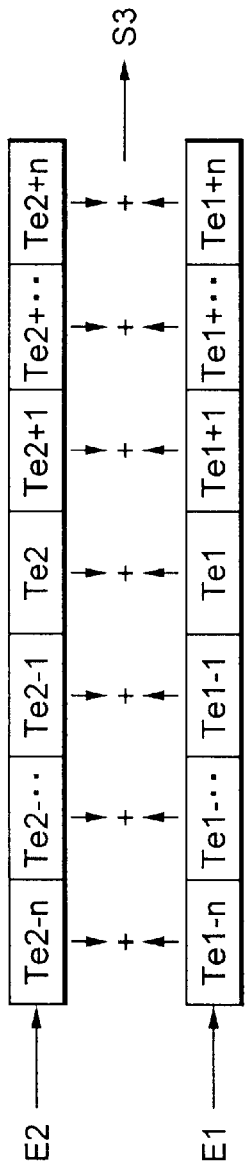
FIGS. 6A, 6B, and 6C illustrate the addition of residual signals in the first embodiment.
Figure 6B:
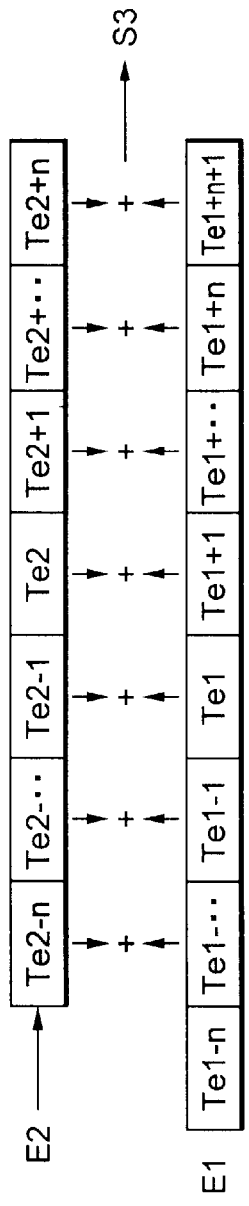
Figure 6C:
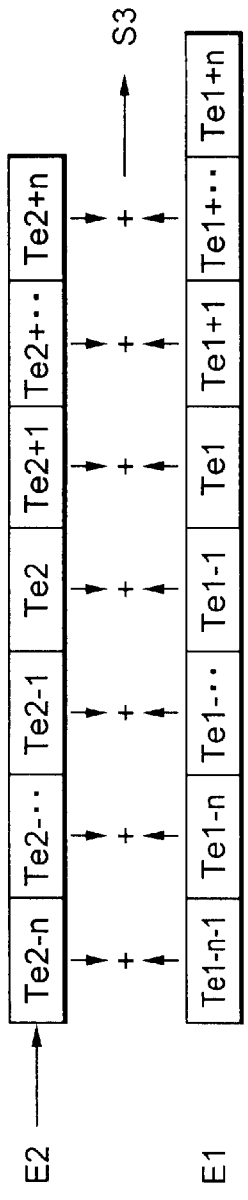

FIGS. 6A, 6B, and 6C illustrate the operation of the sliding adder 27 for various delays. Consecutive samples of the second residual signal E2 are denoted Te2−n, . . . , Te2−1, Te2, Te2+1, . . . , Te2+n, where n is an arbitrary integer. A similar notation is used for consecutive samples of the first residual signal E1. If the delay td3 is zero, corresponding samples are added as shown in FIG. 6A. If the delay td3 has a positive value equivalent to one sampling period (td3=+1), the samples are realigned as shown in FIG. 6B, so that Te2 is added to Te1+1, for example. If the delay td3 has a negative value of one sampling period (td3=−1), the samples are realigned as shown in FIG. 6C, Te2 now being added to Te1−1.

When a transition to the transmit single-talk state occurs, operations similar to those described above take place, reducing the background noise component relative to the speech component in the output signal S3.

By combining the two residual signals so that the near-end party's speech components reinforce one another while the residual echo components and the background noise components do not, the first embodiment improves the signal-to-noise ratio of the outgoing speech signal Sout in the double-talk state and the transmit single-talk state.

Next, a second embodiment will be described.

Figure 7:
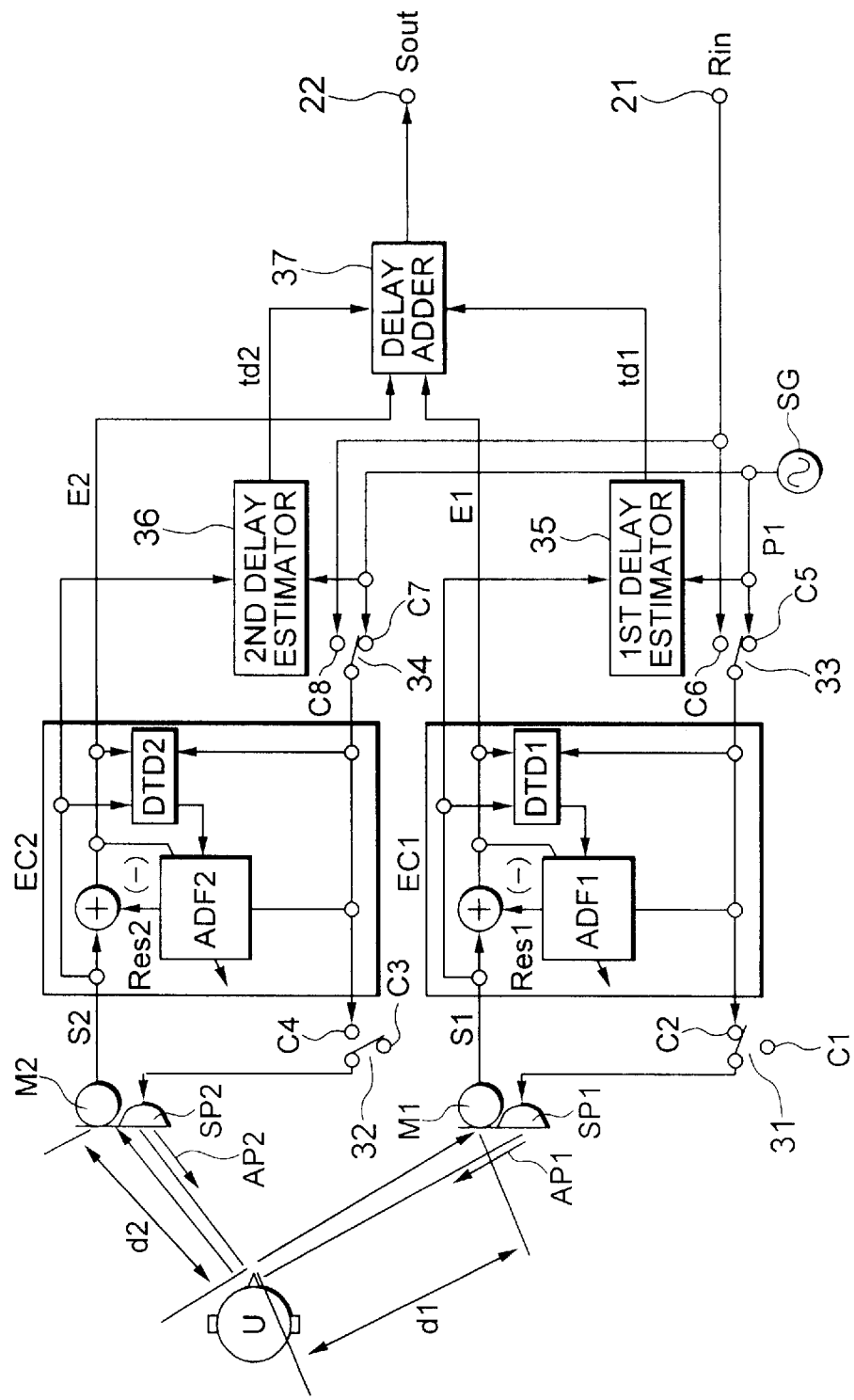
FIG. 7 is a block diagram of an echo canceling apparatus illustrating a second embodiment.

Referring to FIG. 7, the second embodiment is an echo canceling apparatus comprising input and output terminals 21, 22, microphones M1, M2, and echo cancelers EC1, EC2 as described in the first embodiment, a signal generator SG, a pair of loudspeakers SP1, SP2, switches 31, 32, 33, 34, delay estimators 35, 36, and a delay adder 37. Microphone M1 and loudspeaker SP1 are mutually adjacent. Microphone M2 and loudspeaker SP2 are mutually adjacent. Microphone M1 and microphone M2 are preferably disposed well apart from one another. The combining unit in the second embodiment comprises the delay estimators 35, 36 and delay adder 37. The second embodiment operates in much the same way as the first embodiment. The following description will focus on the differences between the two embodiments. The essential differences concern the signal generator SG, the second loudspeaker SP2, the two delay estimators 35, 36, and the delay adder 37.

When set to one position, switches 31, 32 couple loudspeakers SP1, SP2 to echo cancelers EC1, EC2, respectively. When set to another position, these switches 31, 32 disconnect loudspeakers SP1, SP2 so that they are not connected to any other circuits. Switches 33, 34 select either the received far-end signal Rin or a reference signal P1 output by the signal generator SG for input to the two echo cancelers EC1, EC2. Reference signal P1 is also input to the two delay estimators 35, 36.

Figure 8:
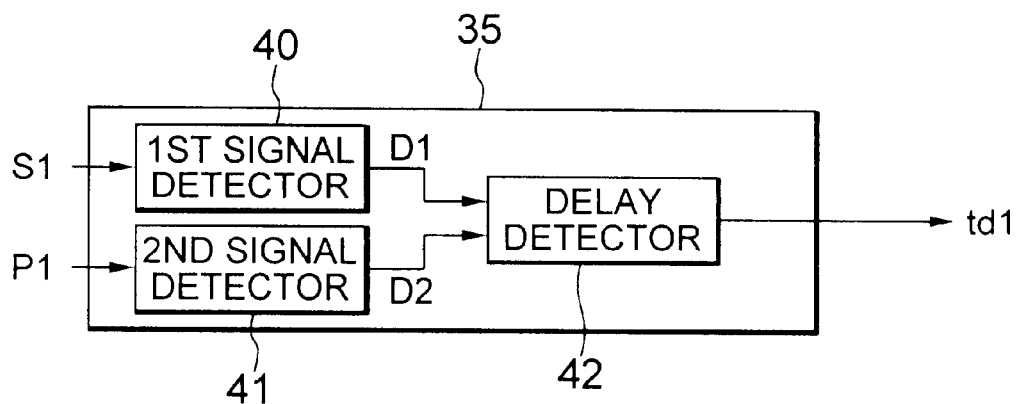
FIG. 8 is a block diagram illustrating the internal structure of the first delay estimator in FIG. 7.

FIG. 8 illustrates the internal structure of the first delay estimator 35. A first signal detector 40 receives the first microphone output signal S1. A second signal detector 41 receives the reference signal P1. A delay detector 42 compares the outputs D1, D2 of signal detectors 40, 41 and outputs a delay value td1 equal to one-half the delay from a transition in the output D2 of the second signal detector 41 to the corresponding transition in the output D1 of the first signal detector 40. This delay td1 is supplied to the delay adder 37 in FIG. 7.

The second delay estimator 36 has a similar structure, receiving the reference signal P1 and second microphone output signal S2, and supplying a delay value td2 to the delay adder 37.

Figure 9:
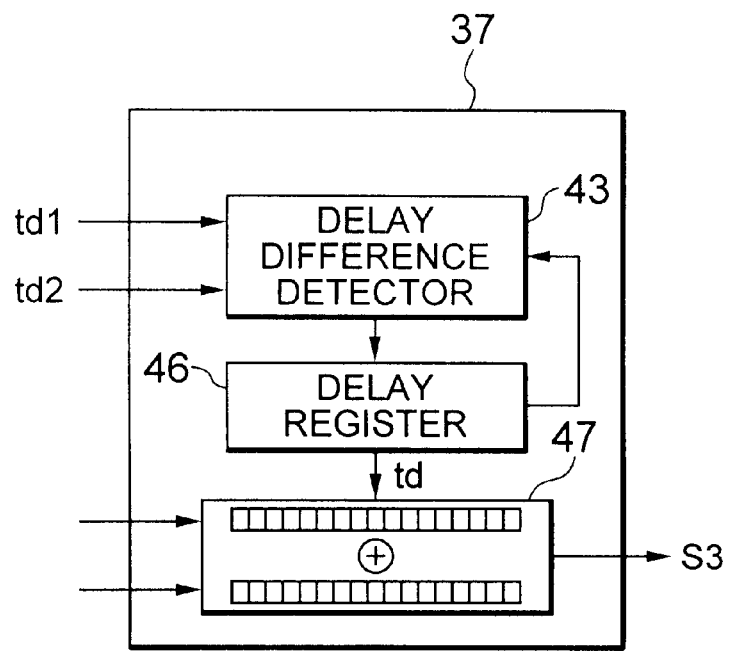
FIG. 9 is a block diagram illustrating the internal structure of the delay adder in FIG. 7.

Referring to FIG. 9, the delay adder 37 comprises a delay difference detector 43 that receives and temporarily stores the two delay values td1 and td2 from the delay estimators 35, 36, and determines the difference td between td1 and td2. The difference td is stored in a delay register 46 and supplied to a sliding adder 47 that receives the two residual signals E1, E2 from the echo cancelers EC1, EC2. The sliding adder 47 aligns the residual signals E1, E2 according to the delay difference td and adds them together as described in the first embodiment to generate an output signal S3, which is supplied to the output terminal 22 in FIG. 7 as the outgoing speech signal Sout.

Before communication between the near-end and far-end parties takes place via signals Rin and Sout, the echo canceling apparatus in the second embodiment performs a series of operations to estimate the delay between the two residual signals. These operations include a first operation in which the reference signal P1 is reproduced as a first acoustic reference signal AP1 through the first loudspeaker SP1, reflected from the near-end party U, and picked up by the first microphone M1; and a second operation in which reference signal P1 is reproduced as a second acoustic reference signal AP2 through the second loudspeaker SP2, reflected from the near-end party U, and picked up by the second microphone M2. Both operations are carried out in an artificially created receive single-talk state. The two operations may be performed in either order. Switches 31, 32, 33, 34 enable both operations to be carried out with a single signal generator SG.

The reference signal P1 has, for example, a pseudo-random waveform comprising bursts of activity separated by intervals with no activity.

In the first operation, switches 31 and 33 are set to positions C2 and C5, respectively, coupling echo canceler EC1 to the first loudspeaker SP1 and the signal generator SG. Switch 32 is set to position C3, disconnecting the second loudspeaker SP2 from echo canceler EC2. Switch 34 may be set to either position; it will be assumed below that this switch is set to position C7, coupling echo canceler EC2 to the signal generator SG. These switch settings are as illustrated in FIG. 7. The first loudspeaker SP1 receives the reference signal P1, while the second loudspeaker SP2 receives no input signal.

The first acoustic reference signal AP1 takes a time td1 to travel the distance d1 from the first loudspeaker SP1 to the near-end party U, and the same time td1 to return from U to the first microphone M1. The round-trip delay is thus 2*td1, where the asterisk indicates multiplication. In the first delay estimator 35, when the second signal detector 41 detects activity in the reference signal P1, the first signal detector 40 detects corresponding activity in the signal S1 a time 2*td1 later. By dividing 2*td1 by two, the delay detector 42 obtains the output delay value td1. This delay value is stored in the delay detector 42 and supplied to the delay adder 37.

FIG. 10A illustrates the operation of the first delay estimator 35, showing waveforms of the first reference acoustic signal AP1, the first microphone output signal S1, the detection signal D1 output by the first signal detector 40, and the detection signal D2 output by the second signal detector 41. The second detection signal D2 goes high at the time t01 when activity in the reference signal P1 is detected, this also being the time when the acoustic reference signal AP1 becomes active. The first detection signal D1 goes high at a time ti when activity is detected in microphone output signal S1, an interval 2*td1 later. The delay detector 42 subtracts t01 from t1 to determine the round-trip delay (t1−t01), and divides the round-trip delay by two or, equivalently, multiplies it by 0.5, to obtain the delay value td1.

$$td1 = 0.5*(t1-t01)$$

In the second operation, switch 31 is set to position C1 and switch 32 to position C4, so that the second loudspeaker SP2 receives the reference signal P1 and the first loudspeaker SP1 receives no input signal. Switches 33 and 34 are left set to contacts C5 and C7, connecting the echo cancelers EC1, EC2 to the signal generator SG. (Alternatively, switch 33 may be set to position C8.) The second operation is illustrated in FIG. 10B, in which AP2 is the waveform of the second acoustic reference signal, S2 is the waveform of the second microphone output signal, D1 is the output waveform of the first signal detector in the second delay estimator 36, and D2 is the output waveform of the second signal detector in the second delay estimator 36. The reference signal P1 and second acoustic reference signal AP2 become active at time t02. Activity is detected in the second microphone output signal S2 at time t2. The delay detector in the second delay estimator 36 calculates the second delay time td2 as one-half the round-trip delay of the echo of the second acoustic reference signal AP2, as in the following equation.

$$td2 = 0.5*(t2-t02)$$

When the first and second operations described above have been completed, the delay difference detector 43 in the delay adder 37 subtracts delay value td1 from delay value td2 to obtain the delay td, as in the following equation.

$$td = td2-td1$$

The operation of the delay difference detector 43 is illustrated conceptually in FIG. 10C, in which time t03 is the time of arrival of the acoustic reference signals AP1 and AP2 at the acoustic reflecting surfaces of the near-end party U. The waveform D1' output by the first signal detector 40 in the first delay estimator 35 and the waveform D1" output by the first signal detector in the second delay estimator 36 have been shifted on the time axis so that they are aligned with respect to t03.

During normal communication, only one of the loudspeakers SP1, SP2 is used. If the first loudspeaker SP1 is used, switch 31 is set to position C2 and switch 32 to position C3, so that loudspeaker SP1 is coupled to echo canceler EC1 and the second loudspeaker SP2 is disconnected from echo canceler EC2. Switches 33 and 34 are set to positions C6 and C8, supplying the received far-end signal Rin to both echo cancelers EC1, EC2. The sliding adder 47 operates according to the delay time td determined as explained above, delaying residual signal E1 if td is positive and delaying residual signal E2 if td is negative, then adding the two residual signals together to obtain the outgoing speech signal Sout.

When the two residual signals are combined, the near-end party's voice signal is reinforced as in the first embodiment, while background noise and residual echo are relatively weakened. The second embodiment thus provides the same general effect as the first embodiment, but by using a reference signal P1 to measure the delay times td1 and td2, instead of using the near-end party's voice signal for this purpose, the second embodiment can measure the delay times more accurately than the first embodiment. The reason is that the reference signal P1 provides a sharply defined off-to-on transition, while the onset of speech may be more gradual, and more difficult to detect precisely.

In a variation of the second. embodiment, the timing delay td is determined as one-half of the difference between the first round-trip delay and the second round-trip delay, as in the following equation.

$$td=0.5*\{(t2-t02)-(t1-t01)\}$$

This variation gives the same result but requires slightly less arithmetic.

Next, a third embodiment will be described.

Figure 11:
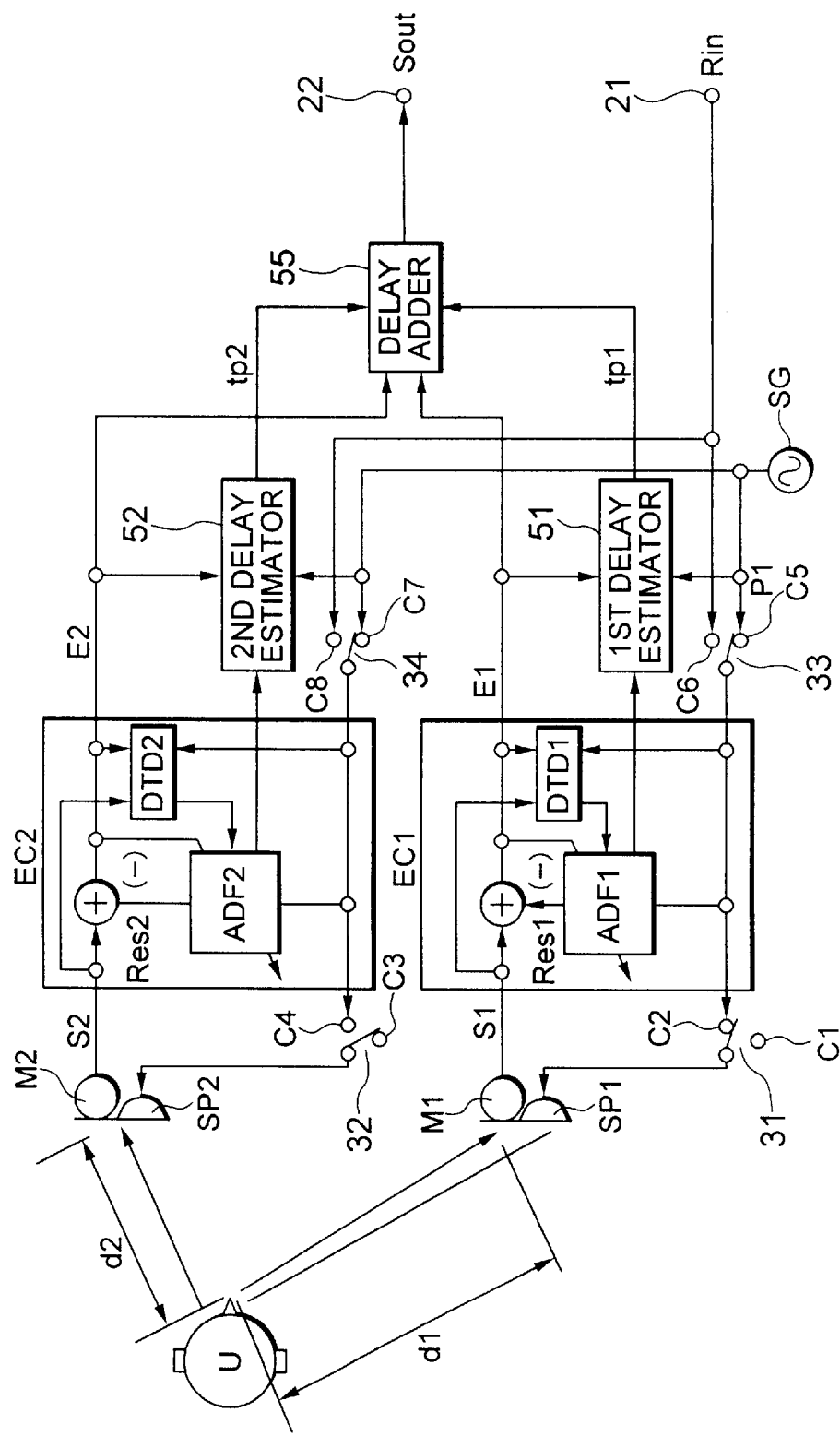
FIG. 11 is a block diagram of an echo canceling apparatus illustrating a third embodiment.

Referring to FIG. 11, the echo canceling apparatus in the third embodiment has the same overall configuration as in the second embodiment, but differs in that the two delay estimators 51, 52 receive the residual signals E1, E2, respectively, instead of the microphone output signals S1, S2. The delay estimators 51, 52 also receive the tap coefficients from the adaptive filters ADF1, ADF2, respectively.

Figure 12:
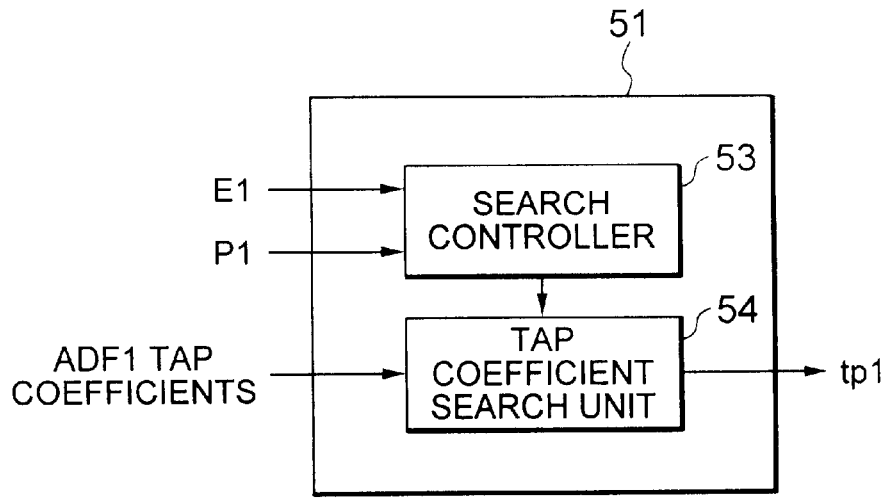
FIG. 12 is a block diagram illustrating the internal structure of the first delay estimator in FIG. 11.

FIG. 12 shows the internal structure of the first delay estimator 51, which comprises a search controller 53 and a tap coefficient search unit 54.

The search controller 53 receives the first residual signal E1 and the reference signal P1 output by the signal source SG, and determines whether the tap coefficients of adaptive filter ADF1 have converged. The convergence criterion is that the power of the first residual signal E1 has remained at a substantially constant value, much lower than the power of the reference signal (P1>>E1), for a predetermined length of time.

When the search controller 53 determines that the ADF1 tap coefficients have occurred, the tap coefficient search unit 54 reads these tap coefficients, and searches for the peak coefficient value. If the peak tap coefficient is the n-th tap coefficient, this being the coefficient by which the n-th sample before the current sample of microphone output signal S1 is multiplied in the adaptive filter ADF1, the tap coefficient search unit 54 divides n by two to obtain a tap position value tp1. Thus n is an integer and tp1 is equal to n/2.

The second delay estimator 52 has a similar structure, determining a tap position value tp2 from the second residual signal E2, the reference signal P1, and the tap coefficients of adaptive filter ADF2.

Figure 13:
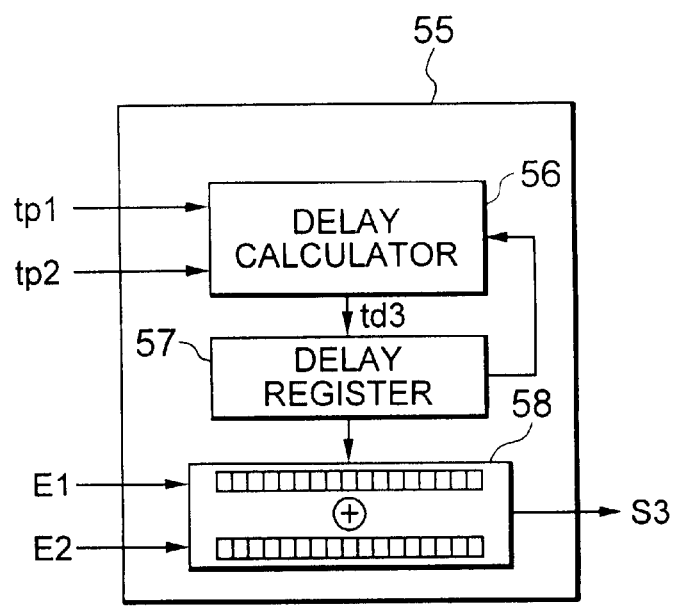
FIG. 13 is a block diagram illustrating the internal structure of the delay adder in FIG. 11.

Referring again to FIG. 11, the two tap position values tp1, tp2 are supplied to a delay adder 55 generally similar to the delay adder 37 in the second embodiment. Referring to FIG. 13, the delay adder 55 comprises a delay calculator 56, a delay register 57, and a sliding adder 58. The delay calculator 56 calculates a delay value td3 from the tap position values tp1, tp2. The delay register 57 stores the calculated delay value td3. The sliding adder 58 aligns the residual signals E1, E2 according to the delay value td3 and adds them together as described in the first embodiment to generate an output signal S3, which is supplied to the output terminal 22 as the outgoing speech signal Sout.

In the third embodiment, communication is preceded by a first operation and a second operation, which are carried out with the same switch settings as in the second embodiment.

In the first operation, the tap coefficients of adaptive filter ADF1 converge until the echo of the first acoustic reference signal AP1 is substantially canceled from the first microphone output signal S1. The tap coefficients then have values as shown, for example, at the top of FIG. 14A, representing the impulse response of the echo path from the first loudspeaker SP1 to the near-end party U to the first microphone M1. T is the sampling period of the received far-end signal Rin. The tap coefficient search unit 54 in the first delay estimator 51 outputs a tap position value tp1 such that the peak tap coefficient is the (2*tp1)-th tap coefficient.

In the second operation, the tap coefficients of adaptive filter ADF2 converge to values as shown, for example, at the top of FIG. 14B, representing the impulse response of the echo path from the second loudspeaker SP2 to the near-end party U to the second microphone M2. The tap coefficient search unit in the second delay estimator 52 outputs a tap position value tp2 such that the peak tap coefficient in adaptive filter ADF2 is the (2*tp2)-th tap coefficient.

After the first and second operations have been completed, the delay calculator 56 calculates the delay value td3 by subtracting tp2 from tp1 and multiplying the difference (tp3) by the sampling period T, as follows.

$$tp3=tp1-tp2$$

$$td3=tp3*T$$

These operations are illustrated in FIG. 14C. Incidentally, the horizontal scale in FIG. 14C is expanded by a factor of two, as compared with the horizontal scales in FIGS. 14A and 14B.

The delay calculator 56 sets the result td3 in the delay register 57, and the sliding adder 58 operates essentially as described in the first and second embodiments, delaying the second residual signal E2 if td3 is positive, and delaying the first residual signal E1 if td3 is negative, to generate an output signal S3 for use as the outgoing speech signal Sout.

The third embodiment provides substantially the same effects as the second embodiment, but the calculated delay td3 is even more reliable than the delay td obtained in the second embodiment, because the values tp1 and tp2 are obtained through a filter convergence process, by processing many echoes of the acoustic reference signals AP1 and AP2.

In a variation of the third embodiment, only one loudspeaker is employed. The first acoustic reference signal is reproduced through the loudspeaker and picked up by the first microphone. The second acoustic reference signal is reproduced through the same loudspeaker but picked up by the second microphone. The time delay td3 is obtained from the difference between the positions of the peak tap coefficients in the two adaptive filters, without dividing the difference by two.

In a further variation of the third embodiment, only one loudspeaker is employed, and the time delay td3 is obtained by comparing the two sets of tap coefficients after both sets of coefficients have converged during normal operation, without generating a reference signal.

Next, a fourth embodiment will be described. The fourth embodiment has the same general configuration as the first embodiment, illustrated in FIG. 2, but differs in the internal structure of the delay adder 24.

Referring to FIG. 15, the delay adder 24 in the fourth embodiment comprises a near-end speech detector 62, a peak correlation detector 63, a delay register 64, a sliding correlator 65, and a switch 66.

The near-end speech detector 62 receives the two talk state signals vd1, vd2, and generates a start signal St. The start signal St becomes active when both talk state signals indicate the double-talk state or the transmit single-talk state; that is, when both talk state signals indicate that the near-end party U is speaking.

The sliding correlator 65 has two modes of operation: a normal mode and a correlating mode. In the normal mode, the sliding correlator 65 aligns the two residual signals E1, E2 according to a timing delay set in the delay register 64, and adds the aligned residual signals together as described in the first embodiment. In the correlating mode, the sliding correlator 65 performs a multiply-accumulate operation on the two residual signals E1, E2, which it aligns according to an internally generated timing delay. The multiply-accumulate operation, in which each E1 value is multiplied by the corresponding E2 value and the products are added up, is also referred to as a correlation operation. The sliding correlator 65 includes a pair of memory facilities DT for storing the two residual signals E1, E2, so that the correlation operation can be carried out repeatedly, with different timing delays, in a short time by using the same residual-signal data repeatedly.

The switch 66 is opened (as shown) when the sliding correlator 65 operates in the correlating mode, and closed when the sliding correlator 65 operates in the normal mode.

The peak correlation detector 63 examines the results of the correlation operations carried out by the sliding correlator 65 in the correlating mode, and sets the time delay td3 used by the sliding correlator 65 in the normal mode in the delay register 64.

Next, the operation of the fourth embodiment will be described.

In the normal mode, the sliding correlator 65 operates as a sliding adder, processing one pair of samples of the two residual signals E1 and E2 at a time, generating an output signal S3 by adding the two samples values together. Even during the normal mode of operation, however, the sliding correlator 65 stores the residual signals E1, E2 in its memory facilities DT.

After the start signal St changes from the inactive to the active state, the sliding correlator 65 performs repeated correlation operations on the sample data stored in its memory facilities DT, varying the time delay over a range of values. For each correlation operation, the sliding correlator 65 informs the peak correlation detector 63 of the time delay and the correlation result. The peak correlation detector 63 sets the time delay td3 that produces the maximum correlation result in the delay register 64. When the correlation operations have been completed, the sliding correlator 65 resumes operation in the normal mode, using the delay value td3, which remains fixed until the next time the sliding correlator 65 enters the correlating mode.

FIGS. 16A and 16B illustrates the operation of the fourth embodiment. As shown in FIG. 16A, the waveforms of the microphone output signals S1 and S2 are delayed by amounts td1 and td2, respectively, with respect to the near-end party's speech signal AS1, due to the different distance of the two microphones M1 and M2 from the near-end party U. The time delay td3 determined by the sliding correlator 65 and peak correlation detector 63 corresponds to the difference between td1 and td2. As shown in FIG. 16B, during normal operation, the sliding correlator 65 delays the second residual signal E2 by this amount td3 to obtain a residual signal E2' that is aligned with the first residual signal E1 in a way that enhances the near-end party's voice, and adds the delayed signal E2' to the first residual signal E1 to obtain an output signal S3 that is supplied as the outgoing speech signal Sout of the apparatus.

The fourth embodiment provides substantially the same effects as the first embodiment, but the time delay td3 in the fourth embodiment is determined more accurately than the time delay td in the first embodiment, because it is determined by correlating entire segments of two waveforms, instead of simply by comparing two detection times.

Figure 17:
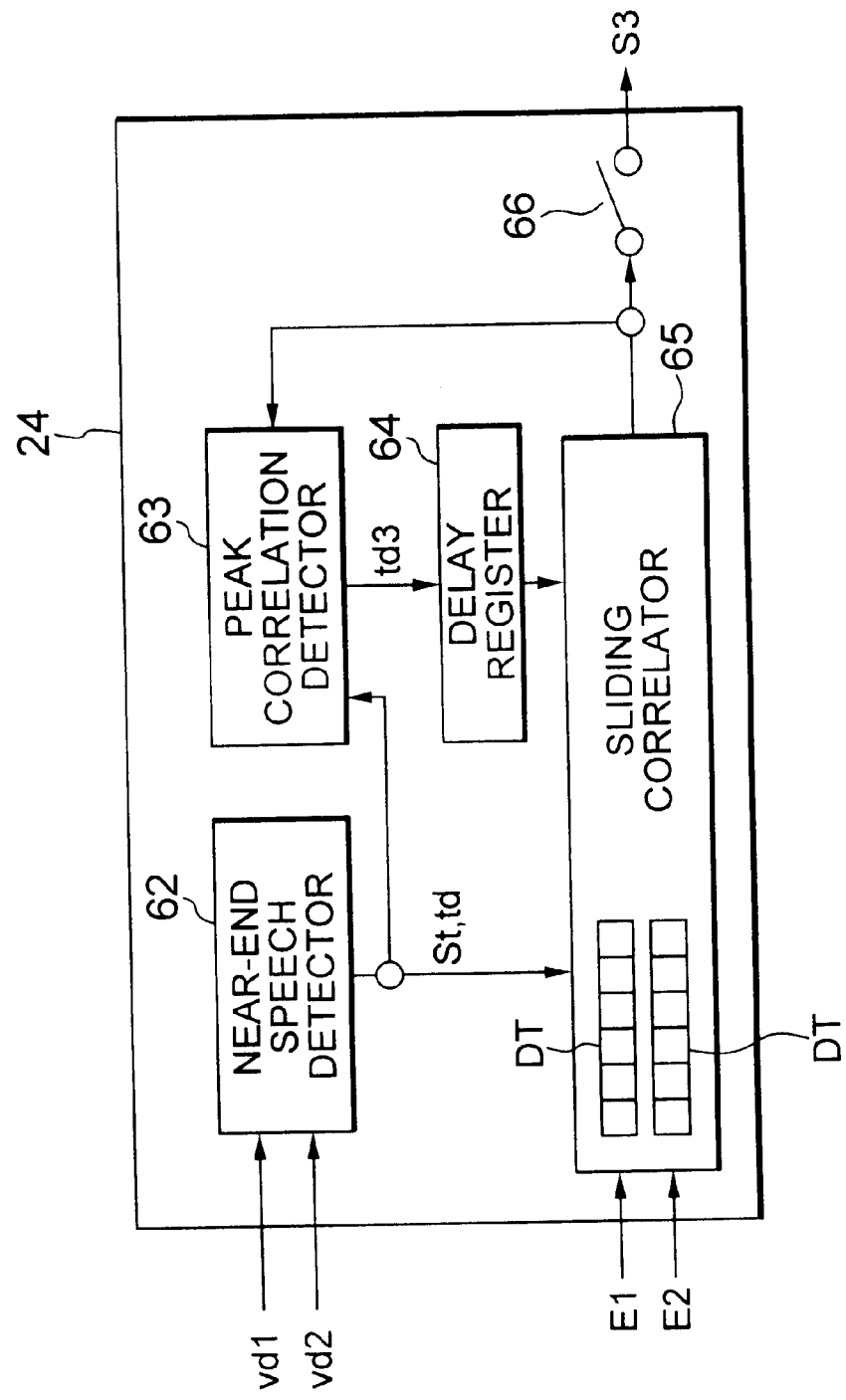
FIG. 17 is a block diagram illustrating the internal structure of the delay adder in a variation of the fourth embodiment.

FIG. 17 illustrates a variation of the fourth embodiment in which the near-end speech detector 62 also supplies the sliding correlator 65 with the difference td between the times at which the two talk state signals vd1, vd2 indicate detection of the double-talk state, or the transmit single-talk state. This difference td has the value described as td3 in the first embodiment. The sliding correlator 65 uses td as an initial value of the time delay in the correlating mode.

By using the td as a starting value, this variation enables the time delay td3 that produces the maximum correlation value to be found quickly, since td3 is likely to be close to td. The number of times the correlation calculation has to be repeated is thus reduced.

Next, a fifth embodiment will be described.

Figure 18:
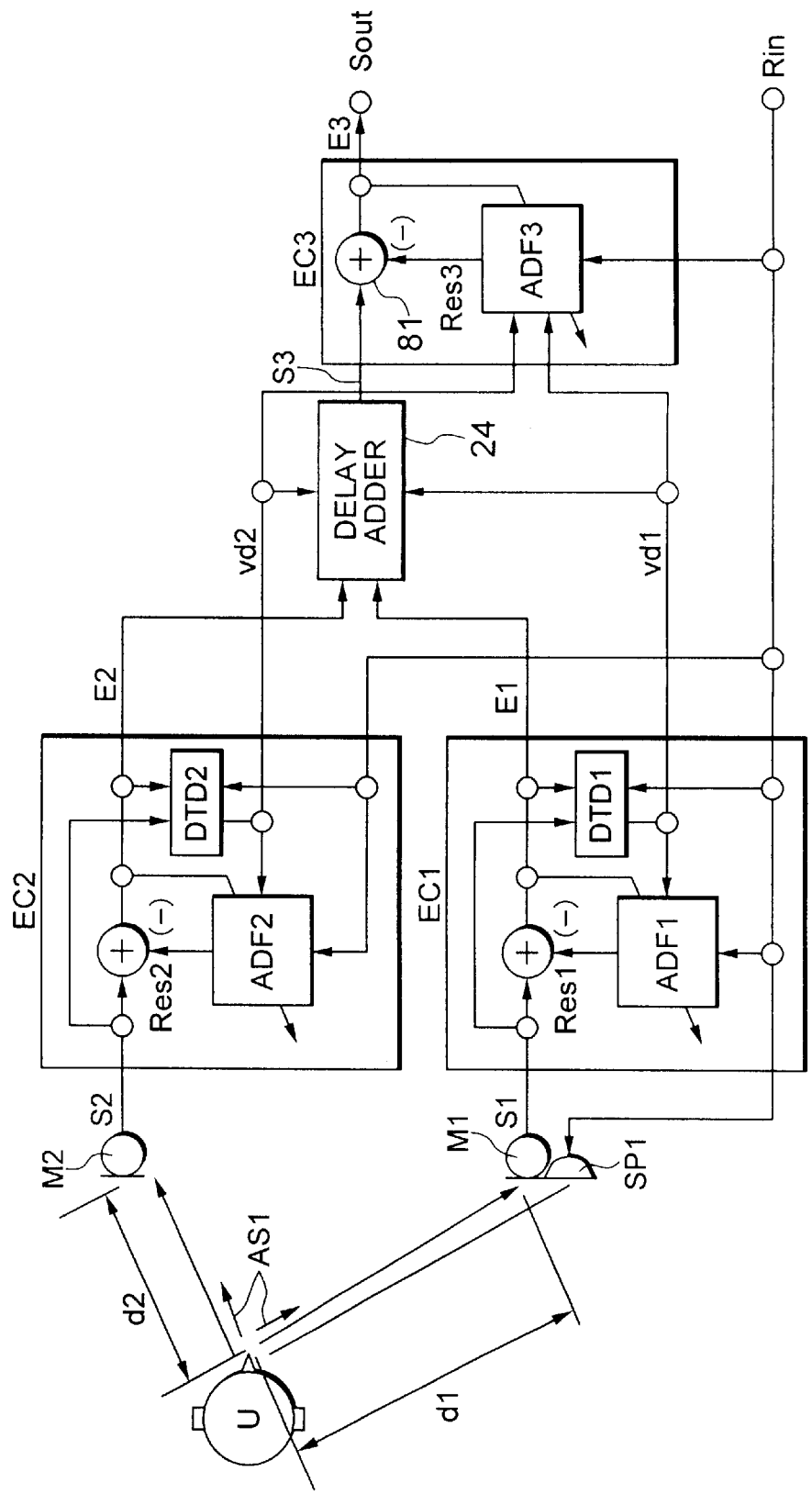
FIG. 18 is a block diagram of an echo canceling apparatus illustrating a fifth embodiment.

Referring to FIG. 18, the fifth embodiment adds a third echo canceler EC3 to the configuration of the first embodiment. The third echo canceler EC3 receives the incoming speech signal Rin, the output signal S3 from the delay adder 24, and the two talk state signals vd1, vd2 output from the talk state detectors DTD1, DTD2 in the first two echo cancelers. The third echo canceler EC3 has an adaptive filter ADF3, similar to adaptive filters ADF1, ADF2, and a subtractor 81 that subtracts the echo replica signal Res3 provided by adaptive filter ADF3 from the signal S3 received from the delay adder 24 to obtain a third residual signal E3 that becomes the outgoing speech signal Sout.

The tap coefficients in the third adaptive filter ADF3 are updated when both talk state signals vd1 and vd2 indicate the receive single-talk state. Updating of the tap coefficients in the third adaptive filter ADF3 stops as soon as either talk state signal vd1 or vd2 indicates the double-talk state.

In the outgoing speech signal S3 received by the third adaptive filter ADF3, residual echo and background noise have already been relatively weakened as described in the first embodiment. In particular, the background noise level has been reduced, in relation to the level of the near-end speech signal. The third adaptive filter ADF3 can therefore reduce the residual echo to a lower level than could the first two adaptive filters ADF1, ADF2.

Next, a sixth embodiment will be described. The sixth embodiment combines the features and effects of the second and fifth embodiments.

Figure 19:
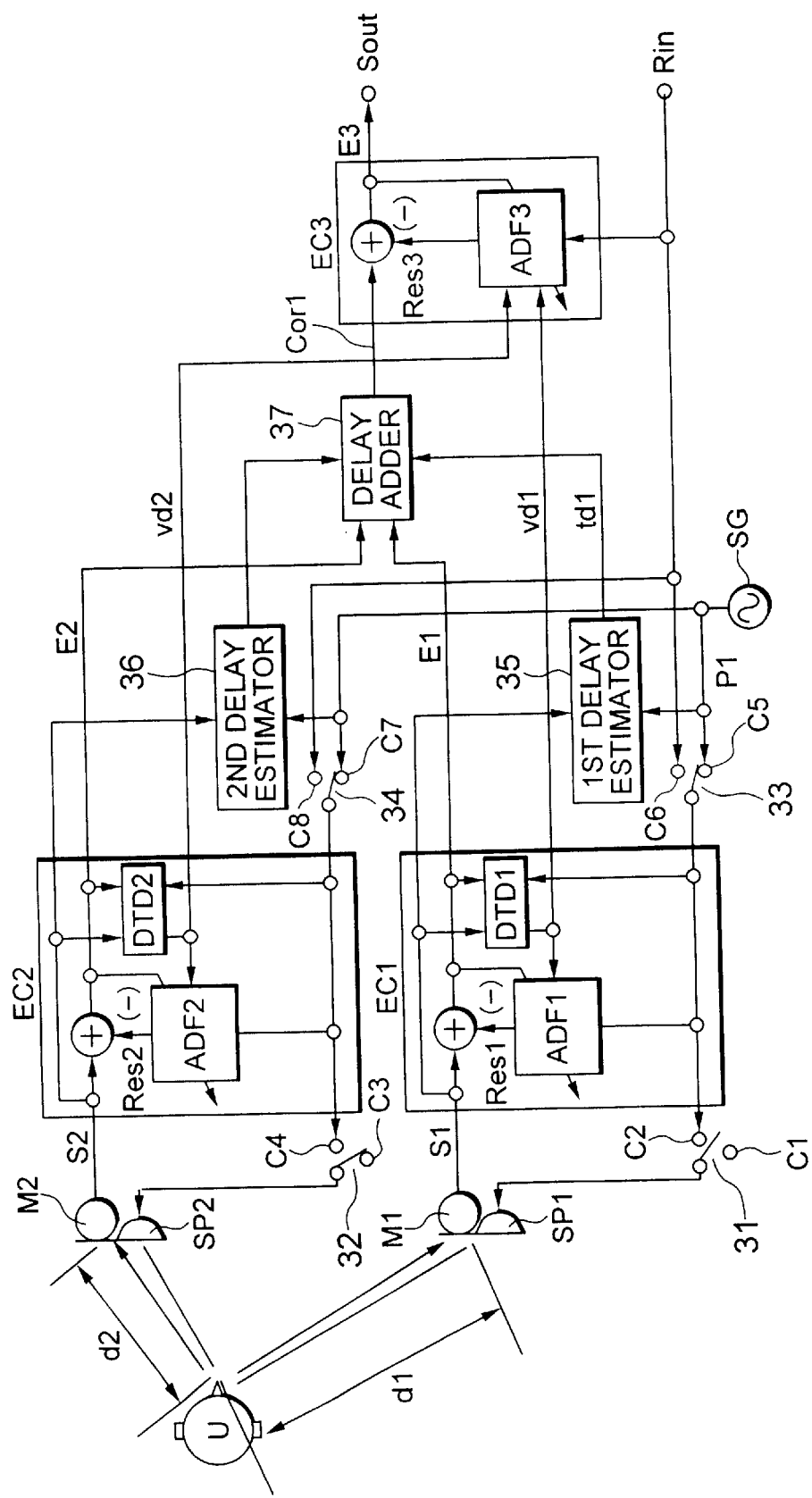
FIG. 19 is a block diagram of an echo canceling apparatus illustrating a sixth embodiment.

Referring to FIG. 19, the sixth embodiment adds a third echo canceler EC3 to the configuration described in the second embodiment. The third echo canceler EC3 operates as described in the fifth embodiment, receiving the incoming speech signal Rin, the output signal S3 from the delay adder 37, and the two talk state signals vd1, vd2 output from the talk state detectors DTD1, DTD2 in the first two echo cancelers EC1, EC2, and generating a third residual signal E3 as the outgoing speech signal Sout.

The operation of the sixth embodiment will not be described, as it can be understood from the descriptions of the second and fifth embodiments.

Next, a seventh embodiment will be described. The seventh embodiment combines the features and effects of the third and fifth embodiments.

Figure 20:
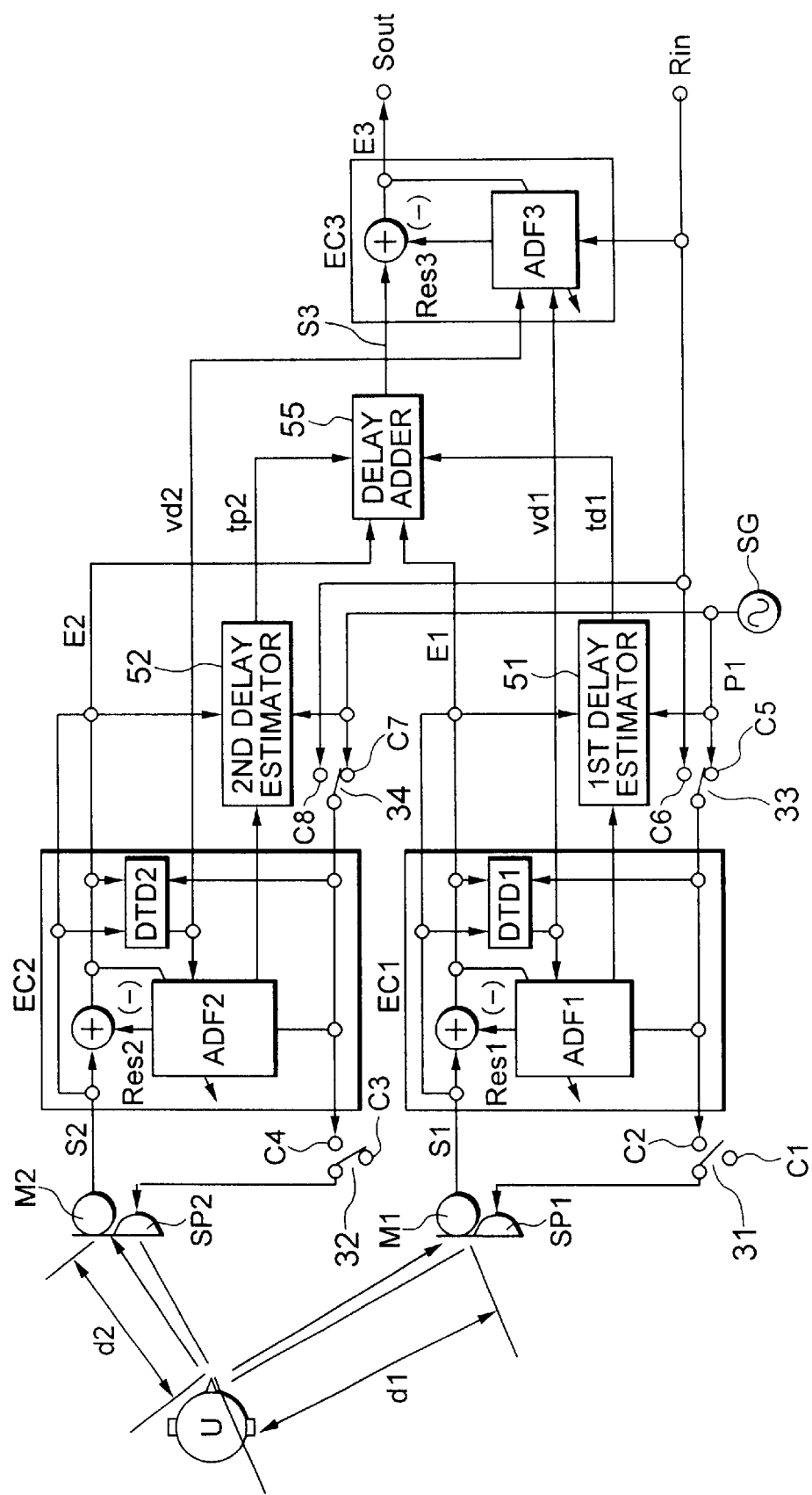
FIG. 20 is a block diagram of an echo canceling apparatus illustrating a seventh embodiment.

Referring to FIG. 20, the seventh embodiment adds a third echo canceler EC3 to the configuration of the third embodiment. The third echo canceler EC3 operates as described in the fifth embodiment, receiving the incoming speech signal Rin, the output signal S3 from the delay adder 55, and the two talk state signals vd1, vd2 output from the talk state detectors DTD1, DTD2 and generating the outgoing speech signal Sout.

The operation of the seventh embodiment will not be described, as it can be understood from the descriptions of the third and fifth embodiments.

A third echo canceler can similarly be added to the configuration of the fourth embodiment, receiving the speech signal S3 output from the sliding correlator 65 in the normal mode of operation, and generating an outgoing speech signal in which residual echo is further reduced.

The embodiments described above have two microphones and two echo cancelers, but the invention can be practiced with more than two microphones and more than two echo cancelers.

The invention can be practiced in hardware, software, or a combination of hardware and software.

Those skilled in the art will recognize that further variations are possible within the scope claimed below.

What is claimed is:

1. A method of canceling echo in an apparatus for communication between a near-end party and a far-end party, comprising the steps of:
    (a) receiving an acoustic signal, including a near-end component originating from the near-end party and an echo component originating from the far-end party, at a first microphone and a second microphone, obtaining a first microphone output signal from the first microphone and a second microphone output signal from the second microphone;
    (b) using a first adaptive filter to cancel the echo component in the first microphone output signal, obtaining a first residual signal;
    (c) using a second adaptive filter to cancel the echo component in the second microphone output signal, obtaining a second residual signal;
    (d) determining a timing delay between the near-end component in the first residual signal and the near-end component in the second residual signal; and
    (e) additively combining the first residual signal and the second residual signal according to the timing delay, thereby obtaining an outgoing signal for transmission to the far-end party.

2. The method of claim 1, wherein:
    said step (b) includes generating a first talk state signal by detecting double-talk and single-talk states in the first microphone output signal;
    said step (c) includes generating a second talk state signal by detecting double-talk and single-talk states in the second microphone output signal; and
    said step (d) includes detecting a timing difference between the first talk state signal and the second talk state signal.

3. The method of claim 1, wherein the apparatus has a first loudspeaker disposed adjacent the first microphone and a second loudspeaker disposed adjacent the second microphone, and said step (d) further comprises the steps of:
    using the first loudspeaker to generate a first acoustic reference signal;
    determining a first round-trip delay of an echo of the first acoustic reference signal in the first microphone output signal;
    using the second loudspeaker to generate a second acoustic reference signal;
    determining a second round-trip delay of an echo of the second acoustic reference signal in the second microphone output signal; and
    taking one-half of a difference between the first round-trip delay and the second round-trip delay.

4. The method of claim 1, wherein:
    said step (b) includes generating a first set of tap coefficients in the first adaptive filter;
    said step (c) includes generating a second set of tap coefficients in the second adaptive filter; and
    said step (d) includes comparing the first set of tap coefficients with the second set of tap coefficients.

5. The method of claim 4, wherein the communication apparatus has a first loudspeaker disposed adjacent the first microphone and a second loudspeaker disposed adjacent the second microphone, and said step (d) further comprises the steps of:
    using the first loudspeaker to generate a first acoustic reference signal;
    waiting for the first set of tap coefficients to converge;
    detecting a first peak position in the first set of tap coefficients;
    using the second loudspeaker to generate a second acoustic reference signal;
    waiting for the second set of tap coefficients to converge;
    detecting a second peak position in the second set of tap coefficients; and
    taking one-half of a difference between the first peak position and the second peak position.

6. The method of claim 1, wherein said step (d) includes performing a sliding correlation of the first residual signal and the second residual signal.

7. The method of claim 6, wherein:
    said step (b) includes generating a first talk state signal by detecting double-talk and single-talk states in the first microphone output signal;
    said step (c) includes generating a second talk state signal by detecting double-talk and single-talk states in the second microphone output signal; and
    the sliding correlation performed in said step (d) starts from an initial timing delay equal to a timing difference between the first talk state signal and the second talk state signal.

8. The method of claim 1, further comprising the step of:
    (f) using a third adaptive filter to cancel residual echo in the outgoing signal.

9. The method of claim 8, wherein the third adaptive filter has tap coefficients, and:
   said step (b) includes generating a first talk state signal by detecting double-talk and single-talk states in the first microphone output signal;
   said step (c) includes generating a second talk state signal by detecting double-talk and single-talk states in the second microphone output signal; and
   said step (f) includes updating the tap coefficients of the third adaptive filter under control of the first talk state signal and the second talk state signal.

10. An echo canceling apparatus for use in communication between a near-end party and a far-end party, comprising:
   a first microphone converting an acoustic signal, including a near-end component originating from the near-end party and an echo component originating from the far-end party, to a first microphone output signal;
   a second microphone converting said acoustic signal to a second microphone output signal;
   a first echo canceler coupled to the first microphone, having a first adaptive filter, canceling the echo component in the first microphone output signal, thereby obtaining a first residual signal;
   a second echo canceler coupled to the second microphone, having a second adaptive filter, canceling the echo component in the second microphone output signal, thereby obtaining a second residual signal; and
   a combining unit coupled to the first echo canceler and the second echo canceler, determining a timing delay between the near-end component in the first residual signal and the near-end component in the second residual signal, and additively combining the first residual signal and the second residual signal according to the timing delay, thereby obtaining an outgoing signal for transmission to the far-end party.

11. The echo canceling apparatus of claim 10, wherein:
   the first echo canceler includes a first talk state detector detecting double-talk and single-talk states in the first microphone output signal, thereby generating a first talk state signal;
   the second echo canceler includes a second talk state detector detecting double-talk and single-talk states in the second microphone output signal, thereby generating a second talk state signal; and
   the combining unit determines the timing delay by detecting a timing difference between the first talk state signal and the second talk state signal.

12. The echo canceling apparatus of claim 10, also having a first loudspeaker disposed adjacent the first microphone, and
   a second loudspeaker disposed adjacent the second microphone,
   wherein the combining unit comprises:
      a signal generator generating a reference signal, the reference signal being reproduced through the first loudspeaker as a first acoustic reference signal, and through the second loudspeaker as a second acoustic reference signal;
      a first delay estimating unit determining a first round-trip delay of an echo of the first acoustic reference signal in the first microphone output signal;
      a second delay estimating unit determining a second round-trip delay of an echo of the second acoustic reference signal in the second microphone output signal; and
      a delay difference detection unit determining said timing delay from a difference between the first round-trip delay and the second round-trip delay.

13. The echo canceling apparatus of claim 10, wherein:
   the first adaptive filter employs a first set of tap coefficients;
   the second adaptive filter employs a second set of tap coefficients; and
   the combining unit determines said timing delay by comparing the first set of tap coefficients with the second set of tap coefficients.

14. The echo canceling apparatus of claim 13, also having a first loudspeaker disposed adjacent the first microphone, and
   a second loudspeaker disposed adjacent the second microphone,
   wherein the combining unit comprises:
      a signal generator generating a reference signal, the reference signal being reproduced through the first loudspeaker as a first acoustic reference signal, and through the second loudspeaker as a second acoustic reference signal;
      a first delay estimating unit detecting a first peak position in the first set of tap coefficients, after the first set of tap coefficients have converged;
      a second delay estimating unit detecting a second peak position in the second set of tap coefficients, after the second set of tap coefficients have converged; and
      a delay calculating unit determining said timing delay from a difference between the first peak position and the second peak position.

15. The echo canceling apparatus of claim 10, wherein the combining unit determines said timing delay by performing a sliding correlation of the first residual signal and the second residual signal.

16. The echo canceling apparatus of claim 15, wherein:
   the first echo canceler includes a first talk state detector detecting double-talk and single-talk states in the first microphone output signal, thereby generating a first talk state signal;
   the second echo canceler includes a second talk state detector detecting double-talk and single-talk states in the second microphone output signal, thereby generating a second talk state signal; and
   the combining unit uses a timing difference between the first talk state signal and the second talk state signal as an initial value in the sliding correlation.

17. The echo canceling apparatus of claim 10, further comprising a third echo canceler having a third adaptive filter, canceling residual echo in the outgoing signal.

18. The echo canceling apparatus of claim 17, wherein said third adaptive filter has tap coefficients, and:
   the first echo canceler includes a first talk state detector detecting double-talk and single-talk states in the first microphone output signal, thereby generating a first talk state signal;
   the second echo canceler includes a second talk state detector detecting double-talk and single-talk states in the second microphone output signal-, thereby generating a second talk state signal; and
   the third adaptive filter updates its tap coefficients under control of the first talk state signal and the second talk state signal.

* * * * *